Feb. 26, 1935.  S. POTSUBAY  1,992,675

LEVEL

Filed June 20, 1934

INVENTOR.
Samuel Potsubay
BY Walter C. Ross
ATTORNEY.

Patented Feb. 26, 1935

1,992,675

UNITED STATES PATENT OFFICE 1,992,675

LEVEL

Samuel Potsubay, Easthampton, Mass., assignor of one-sixth to Albert A. Weidhaas and one-sixth to William A. Weidhaas, both of Easthampton, Mass.

Application June 20, 1934, Serial No. 731,506

8 Claims. (Cl. 33—215)

This invention relates to improvements in levels and is directed more particularly to improvements in levels of the type used by craftsmen of all kinds.

One important object of the invention is the provision of a level which is simple in form but yet adapted for accuracy. As a special feature of the invention, means is provided to facilitate the ready and easy use of the level in connection with work of all kinds. As distinguished from prior art levels where a bubble is employed in connection with a tube the level of this invention has a rotatable indicator which carries indicia for registering with an index in order to obtain the desired accuracy of reading.

Various other novel features and advantages of the invention will be hereinafter referred to in connection with the accompanying description of the preferred form of the invention, reference being had to the accompanying drawing wherein.

Figure 1:
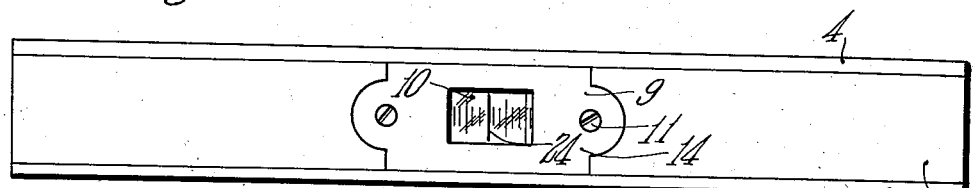
Figs. 1 and 2 are plan and side elevational views respectively of a level embodying the novel features of the invention.
Figure 2:
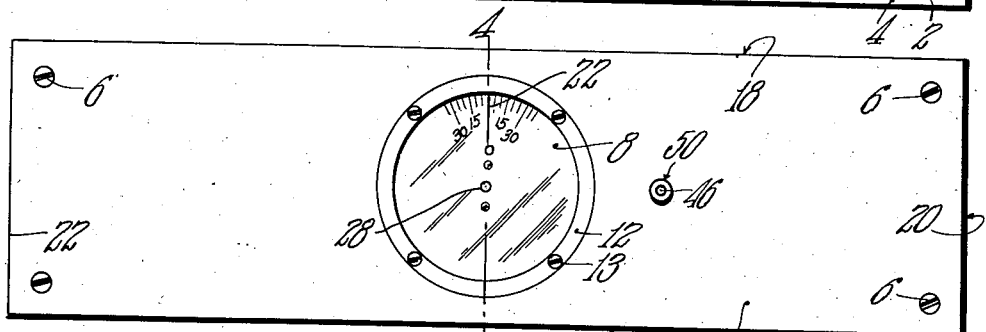

Referring now to the drawing in detail the invention will be more fully described.

The level of the invention preferably consists of a body member which in the form of the invention shown has a central support 2 and side plates 4. The body 2 may be of any material desired as may be the plates 4 but in the form of the invention shown, the plates are preferably of metal such as aluminum or like material and are secured to the body in any well-known manner as by screws 6.

One edge such as the edge 16 of the level may be called a base, and according to the particular embodiment of the level shown other edges may be disposed in some definite relation with respect thereto. An edge 18 is preferably parallel to the edge 16 while other edges such as the ends 20 and 22 are at right angles thereto.

Openings at opposite sides of the level and an opening at the upper edge thereof extend into a central cavity 23, all as shown.

Lenses 8 are disposed over the side openings while a lens 10 is disposed over the opening in the upper edge of the level. Bezels such as 12 disposed over the lenses 8 are held in place by such means as screws 13 while a plate 9 is held over the lens 10 by screws 11. In this way the lenses are retained against displacement and through them an indicating device now to be described is visible.

An indicator is rotatable within the cavity 23 and this preferably includes a drum or rotor 24 having a balance bar 26 associated therewith. Plates such as 27 form sides for the rotor 24.

A shaft 28 is associated with the rotor 24 and balance bar 26 and, in the form of the invention shown, has pointed ends which have bearings in the lenses 8. This is so that the rotor or drum is free to rotate in either direction.

Figure 4:
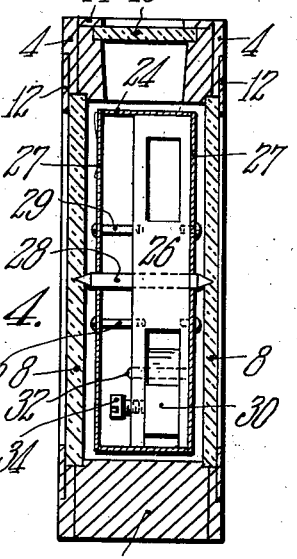
Fig. 4 is a transverse sectional elevational view on the line 4—4 of Fig. 2.

The peripheral wall of the indicator carries graduations or indicia as shown, for registering with an index line 24' associated with the lens 10 and the members 27 carry other graduations or indicia registerable with index lines 22' associated with lenses 8. The plates 27 provide the forward and rear faces of the indicator and they may be held in place as by screws 29 threaded in the balance bar as shown in Fig. 4.

A balance weight 30 is pivoted at 32 to the balance bar 26 for swinging movements and is held in adjusted positions relative thereto by a set screw or the like such as 34 threaded in the balance bar so that its end bears on and clamps the weight.

The weight 30 carries graduations thereon, as shown, so that it may be moved in one direction or another to bring any certain graduation thereof in register with a pointer 36 associated with the end of the balance bar. By swinging the weight 30 back and forth and locking it to the bar it is possible to cause the indicator to assume a position where a certain graduation or indicia thereof will register say with the index line 22' when the level is disposed in a certain plane.

For instance, when the edge 16 of the level is on a support known to be horizontally disposed, the indicator weight may be adjusted so that it assumes a position wherein a certain graduation thereof will register with the index line 22'. In order to insure the correct setting, the weight 30 may be moved in one way or the other through very small angles. The weight at all times tends to swing the indicator so that a certain graduation thereof, say a zero graduation is at top center.

Figure 3:
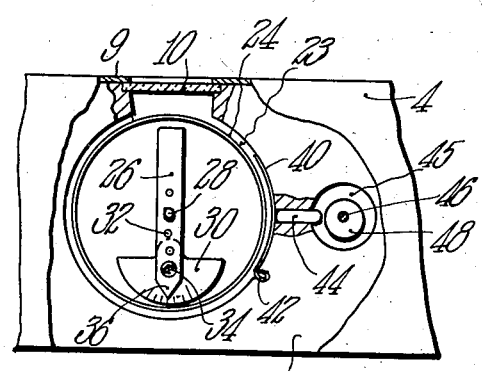
Fig. 3 is a partial side elevational view of the level shown in Figs. 1 and 2 with parts broken away and in section to show certain details of construction.

To prevent rotation of the indicator when the level is not in use, locking means is preferably provided. This may consist of a flat spring-like member 40, shown in Fig. 3, which has its end 42 secured in some manner to the level body. A rod 44 is slidable in the body and a shaft 46 is rotatable on an axis transversely disposed relative to the rod 44. A cam member 48 is disposed in a cavity 45 and is fixed on shaft 46 and outside the level there may be a button or knob 50 fixed to shaft 46 so that the shaft may be manually rotated in one direction or the other.

When it is desired to lock the indicator against rotation, the shaft 46 is turned by means of the member 50 so that the cam acts on the rod 44 which in turn forces the spring into frictional engagement with the indicator. The spring 40 is formed so that when released it moves away from the indicator and its resiliency is overcome by the action of the cam and rod for the locking function.

With the indicator weight adjusted as described and so that a particular graduation of its scale registers with the index when the edge 16 of the level is in a horizontal plane, the indicator will swing or rotate in one direction or the other when the level is disposed so that said edge is in a non-horizontal plane.

The edge 16 of the level, or in fact any of its other edges, may be placed against or on an object which it is desired to level or plumb or to locate at some predetermined angle or plane relative to the true horizontal or vertical. With the level resting on the object the rotor or indicator thereof is caused to rotate to a position where a certain graduation registers with the index lines. The exact inclination or angle of the object relative to the horizontal or vertical is then readily apparent from the relation of the graduations relative to the indexes and the object may be adjusted to the true horizontal or vertical or to some plane having a predetermined inclination relative thereto.

In the form of the invention shown the indicator carries indicia which indicates the degrees of a circle but any other indicia or graduation may be employed. For instance the graduations may indicate the units of inclination relative to units of length.

Figure 5:
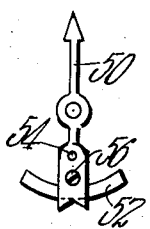
Fig. 5 is an elevational view of a modified form of an indicator adapted to be used with the level of the invention.

In lieu of the indicator already described it may be desirable to employ an indicator such as shown in Fig. 5. This consists of a pointer 50 having a weight 52 movable thereon as by means of a trunnion 54 which is held in adjusted positions by a clamp screw or the like 56.

While I have described the invention in great detail and with respect to a preferred form thereof, it is not desired to be limited thereto since many changes and modifications may be made therein without departing from the spirit and scope of the invention.

What it is desired to claim and secure by Letters Patent of the United States is:

1. A level of the class described comprising in combination, a body having a cavity therein and openings extending thereinto from opposite sides of the body, lenses over said openings on adjacent sides of said body, an indicator rotatable in said cavity including a rotor having indicia on a face and periphery thereof visible through said lenses, an index associated with each of said lenses, a balance bar in said rotor and a weight adjustably associated with said balance bar.

2. A level of the class described comprising in combination, a body having a cavity therein and openings extending thereinto from opposite sides of the body, lenses over said openings on adjacent sides of said body, an indicator rotatable in said cavity including a rotor having indicia on the face and periphery thereof visible through said lenses, an index associated with each of said lenses, a balance bar in said drum, a weight adjustably associated with said balance bar, and manually operable locking means associated with said body adapted to releasably lock said indicator against rotation.

3. A level of the class described comprising in combination, a body having a cavity therein and openings leading thereinto from adjacent sides of the body, lenses over said openings, an indicator rotatable in said cavity having a side wall and a peripheral wall, indexes associated with said lenses, indicia on the side and peripheral walls of the indicator registerable with said indexes, a balance weight associated with said indicator oscillatable on an axis parallel to the axis of rotation thereof, means to secure the said balance weight in various positions of adjustment, a resilient member in said cavity to frictionally engage the indicator and lock the same against rotation and manually operable means to move the said resilient member into locking engagement with said indicator.

4. A level of the class described comprising in combination, a body having a cavity therein and openings leading thereinto from adjacent sides of the body, lenses over said openings, an indicator rotatable in said cavity having a side wall and a peripheral wall, indexes associated with said lenses, indicia on the side and peripheral walls of the indicator registerable with said indexes, a balance weight associated with said indicator oscillatable on an axis parallel to the axis of rotation thereof, means to secure the said balance weight in various positions of adjustment, a resilient member in said cavity to frictionally engage the indicator to lock the same against rotation and manually operable means to move the said resilient member into locking engagement with said indicator, the said resilient member including a spring having an end anchored to said body providing a free end to engage said indicator and the said manually operable means including a rotatable member having a cam for actuating a plunger acting on said spring.

5. A level of the class described comprising in combination, a body member having a cavity therein and openings leading into said cavity from adjacent sides of the body, lenses over said openings, a rotatable shaft extending between one of said adjacent sides of the body and an opposite side thereof, an indicator member consisting of a drum carried by and rotatable with said shaft to have a side wall movable past the opening in said one adjacent side of the body and a peripheral wall movable past the opening in the other adjacent side of the body, co-operating indicating indicia associated with said lenses and said walls of the drum, a balance bar associated with said drum, a weight pivoted to said balance bar so as to be oscillatable on an axis parallel to the axis of rotation of the drum, and means to secure said weight in various positions of adjustment relative to said balance bar.

6. A level of the class described comprising in combination, a body member having a cavity therein and openings leading into said cavity from adjacent sides of the body, lenses over said openings, a rotatable shaft extending between one of said adjacent sides of the body and an opposite side thereof, an indicator member consisting of a drum carried by and rotatable with said shaft to have a side wall movable past the opening in said one adjacent side of the body and a peripheral wall movable past the opening in the other adjacent side of the body, co-operating indicating indicia associated with said lenses and said walls of the drum, a balance bar fixed radially to said drum, a weight pivoted eccentrically to an outer end of said balance bar for oscillation on an axis parallel to the axis of rotation of the drum, registerable indicating means on said bar and weight, and means to secure said weight in various positions of adjustment relative to said balance bar, all adapted and arranged whereby said weight may be adjusted so that certain of the indicating means on the weight and bar are in register to bring certain of the indicia on the said lenses and walls into register.

7. A level of the class described comprising in combination, a body member having a cavity and openings leading thereinto from adjacent sides thereof, lenses over said openings, a rotatable shaft extending between one of said adjacent sides and an opposite side of the body member, an indicator member consisting of a drum rotatable with said shaft to have a peripheral wall movable past the opening in the other of said adjacent sides and a side wall movable past the opening in said one adjacent side, co-operating indicia associated with said lenses and said walls of the drum, and a resilient member in said cavity to frictionally engage the drum to lock the same against rotation, and manually operable means to move said resilient member into locking engagement with said drum, the said resilient member including a spring having one end thereof anchored to said body member and a free end engageable with said drum and said manually operable means including a rotatable member having a cam for actuating a plunger for urging said free end of the spring against said drum.

8. A level of the class described comprising in combination, a body member having a cavity therein and openings leading into said cavity from adjacent sides of the body, lenses over said openings, a rotatable shaft extending between one of said adjacent sides of the body and an opposite side thereof, an indicator member consisting of a drum rotatable with said shaft to have a side wall movable past the opening in said one adjacent side of the body and a peripheral wall movable past the opening in the other adjacent side of the body, co-operating indicating indicia associated with said lenses and walls of the drum, a balance bar associated with said drum, a weight pivoted to said balance bar oscillatable on an axis parallel to the axis of said shaft, means to secure said weight in various positions of adjustment relative to said balance bar, a spring in said cavity having one end anchored to said body and a free end engageable with said drum, and manually operable means for urging said free end of the spring towards said drum including a rotatable member having a cam for actuating a plunger engageable with the spring.

SAMUEL POTSUBAY.